March 24, 1931.  J. W. H. BARR  1,797,601
HANDLING OF GOODS FOR TRANSPORT
Filed July 14, 1930   2 Sheets-Sheet 1
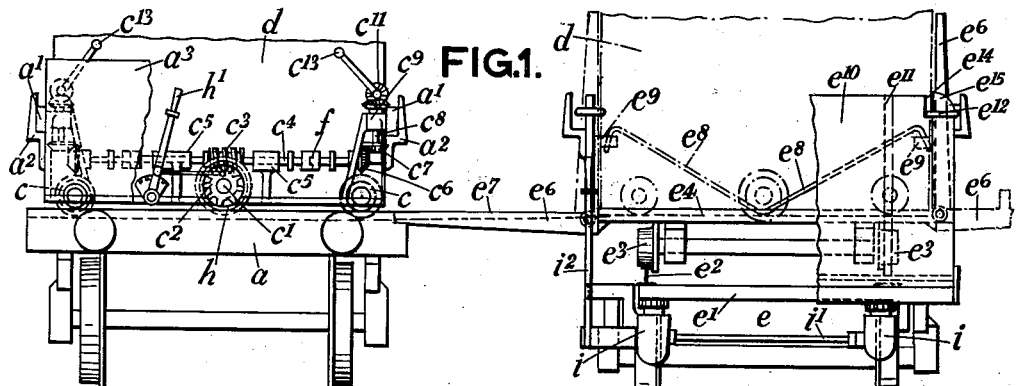
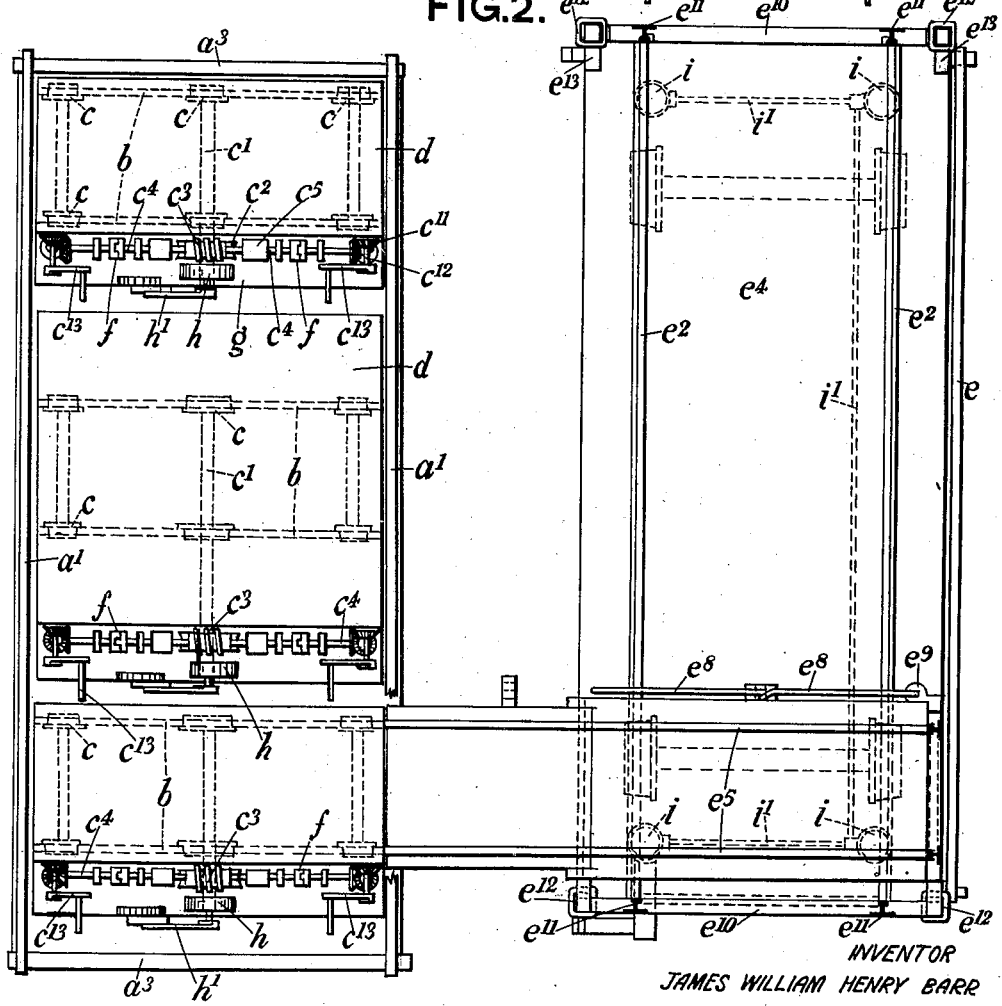
INVENTOR
JAMES WILLIAM HENRY BARR
BY
ATTORNEY March 24, 1931.   J. W. H. BARR   1,797,601
HANDLING OF GOODS FOR TRANSPORT
Filed July 14, 1930    2 Sheets-Sheet 2

INVENTOR
JAMES WILLIAM HENRY BARR

BY *[signature]*

ATTORNEY

Patented Mar. 24, 1931

1,797,601

UNITED STATES PATENT OFFICE

JAMES WILLIAM HENRY BARR, OF BOURNEMOUTH, ENGLAND

HANDLING OF GOODS FOR TRANSPORT

Application filed July 14, 1930, Serial No. 467,901, and in Great Britain June 22, 1929.

This invention relates to the transport of goods, more particularly in connection with railroad systems, and consists in apparatus for use therewith.

More specifically this invention is concerned with the handling of goods in their transfer to or from railroad trucks and to or from lorries onto which the said goods are to be transferred directly or indirectly from the railroad trucks, or vice versa.

According to this invention the goods are assumed to be carried by or packed in convenient containers which are of a convenient length to be carried by a platform railroad truck, or are of some sub-multiple of such length, so that one, two or more according to length may be carried upon each such truck.

On the truck platform is a pair of rails, or several pairs of rails or guides laid transversely and on the bottom of each container are suitable wheels, preferably grooved or flanged wheels, to run on or in said rails or guides, these wheels being as small as conveniently possible or so placed or housed that the bottom of the container may be spaced as closely to the truck platform surface as circumstances may permit.

The invention also comprises a vehicle, hereinafter called an intermediate vehicle which may have a platform capable of being raised or lowered within limits. This intermediate vehicle is intended to be moved along a rail track parallel to the railroad track and if the platform is capable of being raised, the platform can be brought level with that of the railroad trucks. The platform of this vehicle will also be provided with a pair or pairs of rails or guides adapted, when the vehicle is suitably placed, to align with the rails or guides on the platform of the truck.

Lorries having platform surfaces may also be provided with similar rail pairs or guides either placed transversely or longitudinally of the lorry as may be convenient according to its type or size. By the use of these devices a container holding the goods may be drawn from the railroad truck onto the intermediate vehicle and thence onto the lorry platform. Difference in level between the truck platform and the lorry platform being met by correspondingly lowering the intermediate vehicle platform while it carries the container or containers.

In a similar converse manner containers may be transferred from the lorry to the railroad truck, the platform of the intermediate vehicle being operated to raise the load to the railroad truck platform level.

Suitable bridging pieces will be provided to connect to the rail ends to bridge the gaps between the rails of the truck platform, intermediate vehicle platform and lorry platform respectively when a transfer is to be made.

The platform of the intermediate vehicle can be operated by suitable jacking means.

Suitable mechanism is provided whereby the containers may be transferred directly or indirectly to or from the platform truck, from or to a lorry, platform or goods shed. Such mechanism could be carried on the containers or the intermediate vehicle could carry a winch or the like for hauling gear, which could be electrically or otherwise operated for drawing the containers along the rails, and by suitable disposition of pulleys or sheaves and appropriate disposal of the haulage ropes, the containers may be moved from the lorries to the truck or vice versa.

In a modification of this invention there may be disposed along the side of the railroad track a stationary receiving platform provided with a track laid longitudinally thereof either for the whole or only a part of its length, along which the intermediate vehicle is adapted to run for greater ease of alignment, or for example, for carrying containers along the said stationary platform to a place of storage.

It will be understood that suitable chocks or other holding devices will be used where necessary to prevent accidental movement of the containers in transit or otherwise.

The general object of the apparatus above described is to facilitate and speed up the carriage of goods and to avoid the necessity of shunting or detaching trucks from the railroad train for the purpose of loading or unloading. The system with which the containers can be handled will enable a train of goods trucks to run the length of a given track stretch without detaching any truck or attaching any other, thus the duration of stops for each local delivery or reception will be materially shortened.

The invention is illustrated in the accompanying drawings in which:—

Fig. 1 is an end view of a platform railroad truck, intermediate vehicles and sub-vehicle, the container being shown in full lines carried by the truck and in dotted lines transferred to the intermediate vehicle.

Fig. 2 is a plan view.

Referring more particularly to Figs. 1 and 2 a platform railroad truck $a$ is provided with pairs of rails $b$ laid transversely, three such pairs being shown, on which run flanged wheels $c$ mounted on the bottom of containers $d$. The sub-vehicle $e$ comprises a platform $e^1$ the level of which is lower than that of the truck $a$, said platform $e^1$ carrying a pair of rails $e^2$ laid longitudinally on which run flanged wheels $e^3$ of intermediate vehicles $e^4$ each having mounted thereon a pair of rails $e^5$ laid transversely and of the same gauge as the rails $b$ of the truck $a$. Each of said intermediate vehicles $e^4$ is provided with bridging pieces $e^6$ adapted to be let down to bridge the gaps between the rails of the truck $a$ and the intermediate vehicle $e^4$ and the gaps between said vehicle $e^4$ and the lorry or platform onto or from which the containers are to be transferred. Said bridging pieces $e^6$ are provided with rails $e^7$ of the same gauge as the rails $b$ and when let down a continuous transverse rail is provided from the truck $a$ to the intermediate vehicle $e^4$, and from said vehicle to the lorry or stationary platform.

The containers $d$ are preferably provided with three pairs of wheels $c$ so spaced that the whole weight of the container is never on the bridging pieces during the transferring operation.

Means are provided on each container for manually drawing it along the transverse rails. For this purpose the axle $c^1$ of the central pair of wheels $c$ has mounted thereon a worm wheel $c^2$ which meshes with a worm $c^3$ carried by a shaft $c^4$ mounted in suitable bearings $c^5$. The shaft $c^4$ adjacent each of its free ends carries a bevel gear $c^6$ which in turn meshes with a bevel gear $c^7$ carried on one end of a vertical shaft $c^8$, said shaft being mounted in a bearing $c^9$ fixed to the container $d$ and at its other end carrying a bevel gear $c^{10}$ which meshes with a bevel gear $c^{11}$ mounted on a shaft $c^{12}$. The other end of each shaft $c^{12}$ is provided with an operating handle $c^{13}$. Between each operating handle $c^{13}$ and the worm $c^3$, the shaft $c^4$ is provided with a dog clutch $f$ whereby one of said handles may be thrown out of operation when only one operator is working or both said handles may be thrown in or out of operation as desired. A narrow platform $g$ is provided for the operator to stand on when rotating the handle $c^{13}$.

Instead of manually operated means for drawing the containers along the transverse rails, I may provide the containers with an electric motor or other power means.

Figure 4:
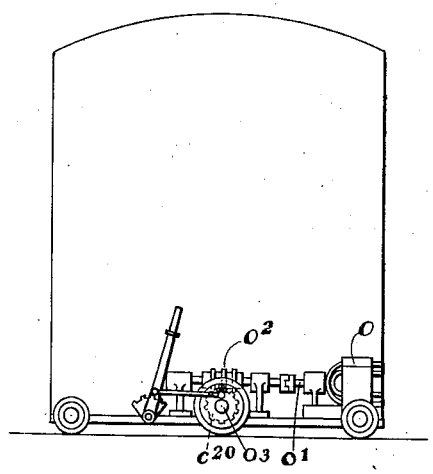
Fig. 4 is a view similar to Fig. 1 and shows an end view of the container with power drive.

Fig. 4 shows the container $d$ as having mounted thereon an electric motor $o$ having a shaft $o^1$ driving by worm gearing $o^2$ a shaft $o^3$ on which are mounted the running wheels $c^{20}$.

An internal expanding brake $h$, Figs. 1 and 2 is provided on the shaft $c^1$ and is operated by a brake lever $h^1$ carried on the platform $g$ whereby the container may be held on the truck $a$ or intermediate vehicle $e^4$ and may be stopped or braked in any position during the transferring operation.

In order that the container $d$ may be securely held on the truck $a$ during movement of the latter, locking bars $a^1$ are provided extending the whole length of the side of the truck and adapted to be held in brackets $a^2$ carried on the ends $a^3$ of the truck.

The bridging pieces $e^6$ on the intermediate vehicle when in the raised position form sides for holding the containers on said vehicle and are locked in their raised position by means of rods $e^8$ pivoted on the member $e^4$ and adapted to engage in lugs $e^9$ carried on said bridging pieces.

In order that the containers may be moved longitudinally from one sub-vehicle to another sub-vehicle, the ends $e^{10}$ of said vehicle are adapted to be lowered to form bridging pieces similar to the bridging pieces $e^6$ and for this purpose are provided with rails $e^{11}$ which form a continuation of the longitudinal rails $e^2$. These ends $e^{10}$ are held in their raised position by means of rings $e^{12}$ pivotally mounted on posts $e^{13}$ carried on the platform $e^1$, said ends being slotted at $e^{14}$ to form lugs $e^{15}$ about which said rings engage.

Means may be provided on the sub vehicle for raising or lowering the intermediate vehicle $e^4$ so that said intermediate vehicle may be on the same level as the platform of the truck $a$ or a stationary platform or lorry, and for this purpose hydraulic jacks $i$ are provided, carried on a stationary part of the sub-vehicle and supporting the platform $e^1$ adjacent its four corners. These jacks are connected together by pipes $i^1$ and are operated by a lever $i^2$ carried at one side of the sub-vehicle.

Figure 3:
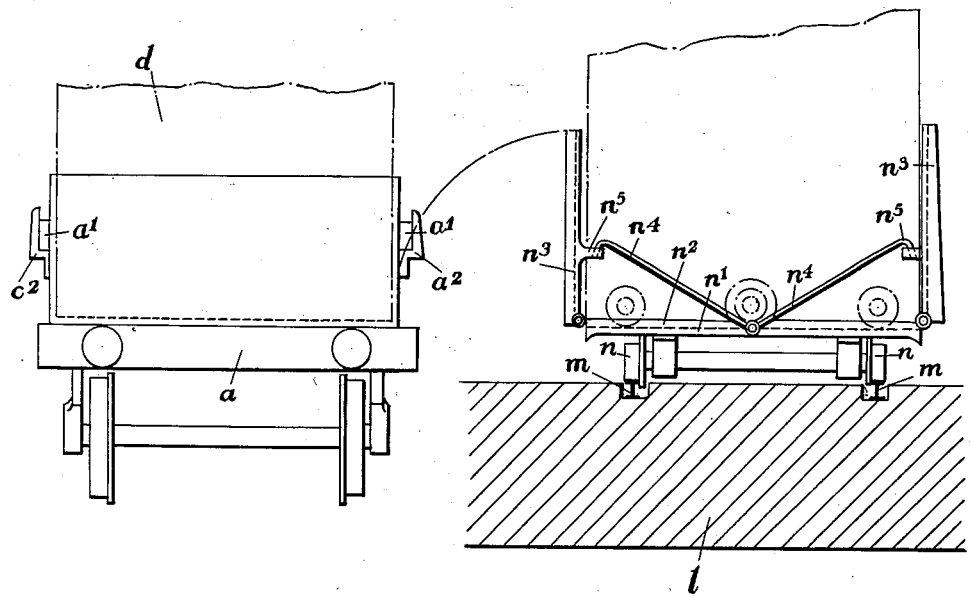
Fig. 3 is an end view of a platform railroad truck, intermediate vehicle and stationary platform for receiving the containers directly from the truck.

Fig. 3 illustrates a modification of the invention in which the container is adapted to be transferred to or from a platform railroad truck from or to an intermediate vehicle adapted to run on rails on a stationary platform. In this arrangement the railroad truck $a$, and the containers $d$ with their associated driving gear are exactly similar to those described in relation to Figs. 1 and 2 and the same reference characters apply but in this construction the stationary platform $l$ is provided with longitudinally laid rails $m$, sunk to the level of the top of said platform on which run the flanged wheels $n$ of intermediate vehicles $n^1$ each having mounted thereon a pair of rails $n^2$ laid transversely and of the same gauge as the rails $b$ of the truck $a$. Each of said intermediate vehicles $n^1$ is provided with bridging pieces $n^3$ similar to and for the same purpose as the bridging pieces $e^6$ of the intermediate vehicle $e^4$. The bridging pieces $n^3$ are held in their raised position by means of rods $n^4$ pivoted on the intermediate vehicle $n^1$ and adapted to engage in lugs $n^5$ carried on the bridging pieces.

The operation of the construction illustrated in Figs. 1 and 2 is as follows:—

Assuming that it is desired to transfer one container from a railroad truck in a siding to a lorry or stationary platform at some distant point from said truck. The sub-vehicle is drawn along the rail track next to said truck and is brought to rest approximately opposite the truck. The bridging piece $e^6$ is then lowered, its free end resting on the platform of the truck, and the intermediate vehicle $e^4$ is pushed along the longitudinal rails $e^2$ until the rails $e^7$ of the bridging piece are in exact alignment with the rails $b$ of the truck. The operator then rotates the handle $c^{13}$ of the container driving gear and the container is driven from the truck $a$ onto the intermediate vehicle. The bridging piece is then raised and the sub-vehicle propelled to the position where it is desired to discharge the container. A similar operation then takes place, the bridging piece being lowered onto the lorry or stationary platform, the rails aligned and the container driven from the intermediate vehicle onto said lorry or platform.

When dealing with trucks, lorries or platforms which are higher or lower than the standard or usual height, a sub-vehicle is used which is provided with the hydraulic jacks $i$, the operator operating the lever $i^2$ until the intermediate $e^4$ is raised or lowered to the same height as the platform of the truck, lorry or stationary platform.

In discharging containers from a number of sub-vehicles into a store for example it may be desirable to discharge the containers from the end of the line of sub-vehicles and for this purpose the ends $e^{10}$ are lowered to form a continuous longitudinal rail over the whole line of vehicles, the containers being transferred with the intermediate vehicles in the store or the like.

The arrangement shown in Fig. 3 operates in a similar manner to that of Figs. 1 and 2 except that the intermediate vehicle $n^1$ runs on rails mounted on a stationary platform, the bridging piece being lowered directly onto the railroad truck.

While the operation has been described as transferring containers from a railroad truck to a lorry or platform it is obvious that by reversing the operation the containers could be transferred from a lorry or platform onto a railroad truck.

The apparatus herein referred to may, in lieu of being constructed for actual transport or trade purposes, be constructed in the form of a toy adapted to form an article for educational and amusement purposes.

What I claim as my invention and desire to secure by Letters Patent of the United States is:—

1. Transport apparatus comprising in combination a railroad track, a railroad car adapted to run on said track, a second track parallel to said first mentioned track, an intermediate vehicle adapted to run on said second track, alignable transverse rails on said railroad car and intermediate vehicle, respectively, containers for the goods adapted to be moved along said transverse rails for transferring the goods to or from said railroad car, said intermediate vehicle being provided at its sides with bridging pieces carrying rails in continuation of said transverse rails and adapted to be temporarily connected to the rail ends of the railroad car to bridge the gaps between the rails of the railroad car and the intermediate vehicle, and means for raising and lowering the second track.

2. Transport apparatus according to claim 1, in which the intermediate vehicle is carried on a sub-vehicle provided with longitudinally extending rails, said sub-vehicle being adapted to run on a third track.

JAMES WILLIAM HENRY BARR.